March 20, 1934.　　　　J. PAVELKA　　　　1,951,667
TOASTER
Filed March 9, 1931
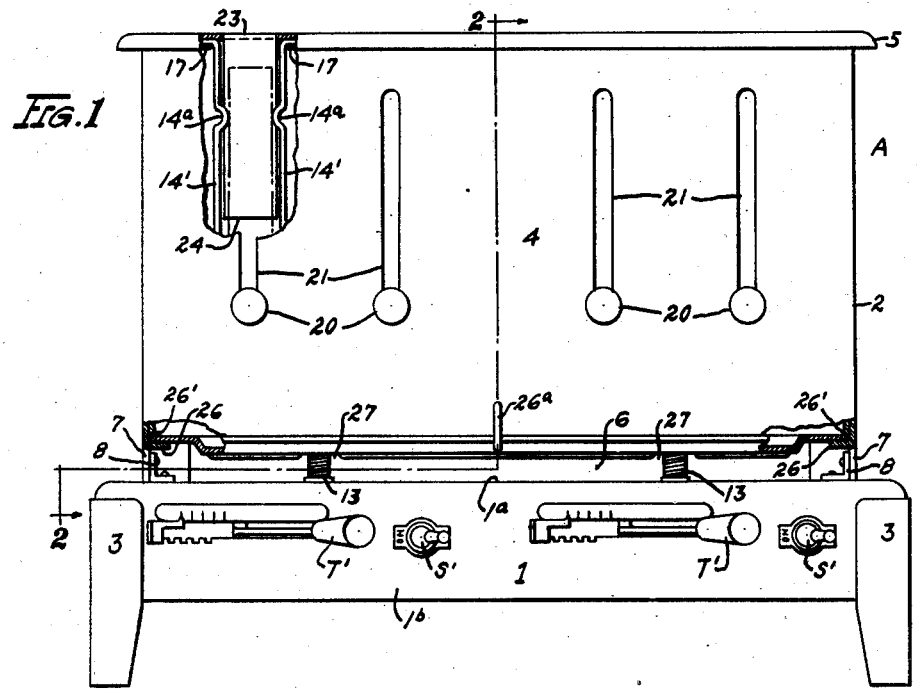
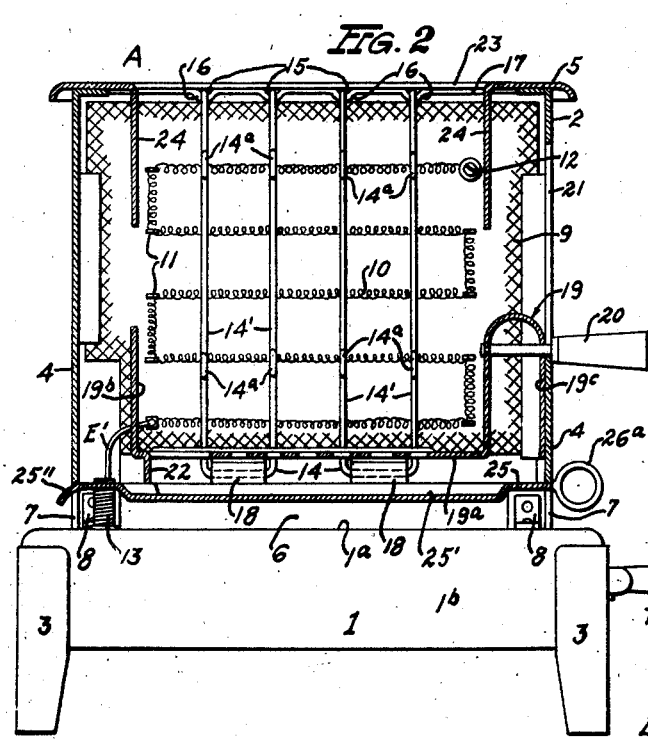
INVENTOR
JOSEPH PAVELKA
By E. M. Harrington
ATTORNEY Patented Mar. 20, 1934

1,951,667

UNITED STATES PATENT OFFICE 1,951,667

TOASTER

Joseph Pavelka, Richmond Heights, Mo.

Application March 9, 1931, Serial No. 521,167

5 Claims. (Cl. 53—5)

This invention relates generally to electric bread toasters and the like and more specifically to the type of electric bread toasters which are provided with automatic timing mechanism for timing the duration of the toasting operations, the predominant object of the invention being to provide an automatically timed electric bread toaster which is of such improved construction that the intricate timing mechanism thereof is protected from the harmful effects of the heat produced during the bread toasting operations.

Prior to this invention many automatically timed electric bread toasters comprised each a base portion and a casing or housing which surmounted said base portion and provided one or more compartments wherein slices of bread were placed to be toasted. The casing or housing referred to enclosed the electric heating elements which produced the heat that performed the toasting operations and obviously because of said heat the casing or housing became quite hot when the toasters were in use. The timing mechanisms of these previously known bread toasters were in most cases arranged within the bases of said toasters and because the upper casings or housings were directly supported by the bases the heat of said casings or housings was transmitted directly to the bases with the result that the timing mechanisms were subjected to a high degree of heat.

The timing mechanisms of automatically timed electric bread toasters are quite intricate, being in many cases in the form of clockworks, and it is quite obvious that the excessive heat to which said timing mechanisms were heretofore subjected would be harmful thereto. As a matter of fact this has proved to be the case as the manufacturers of automatically timed electric bread toasters have been subjected to endless annoyance and inconvenience as well as financial loss due to the failure of timing mechanisms in use, this failure of the timing mechanisms resulting largely from the fact that the excessive heat would take the temper out of metal parts of the timing mechanisms, dry up lubricating oil, set up heat corrosion, and destroy electric switches.

With the foregoing in mind I have devised the improved automatically timed electric bread toaster disclosed in the present application, which, briefly stated, comprises a base and a casing or housing which surmounts the base. The casing or housing referred to provides compartments wherein slices of bread are placed to be toasted and said casing or housing encloses the electric heating elements which produce the heat by which the toasting operations are performed. The fundamental difference between my improved toaster and the toasters which were previously referred to herein resides in the fact that my toaster is so arranged that a free air space is provided between the base of the toaster and the upper casing or housing in which the toasting operations are performed. The provision of this air space completely insulates the upper casing or housing of the toaster wherein heat is produced for toasting bread, from the base of the toaster wherein the intricate timing mechanism is located and as a result of this situation the timing mechanism is absolutely protected from the harmful effects of the heat within the upper casing or housing. It has been found that by insulating the timing mechanisms of the toasters from the heat of the toasting compartments as described above the life of said timing mechanisms is immeasurably prolonged and the efficiency of operation of said timing mechanisms is increased, all of which results in the complete elimination of the annoyances and financial losses to which manufacturers were heretofore subjected.

In addition to the air space for insulating the timing mechanism of the toaster from the heat of the toasting compartments thereof my improved toaster includes a crumb tray which is arranged in the toaster in an entirely novel manner. The crumb tray receives the crumbs which fall from the slices of bread in the toasting compartments of the toaster and provides a sanitary means for the removal of said crumbs.

Figure 1 is a front elevation of my improved toaster, portions thereof being broken away to reveal the interior construction of said toaster.

Figure 2 is a vertical section on line 2—2 of Figure 1.

Figure 3 is a fragmentary inverted plan view of the improved toaster on a reduced scale.

In the drawing, wherein is shown for the purpose of illustration, merely, one embodiment of the invention, A designates the improved toaster generally, said toaster including a base 1 and an upper casing or housing 2 which is arranged above the base 1. The base 1 may be of any suitable construction, the particular base illustrated in the drawing comprising a top wall 1ª from which integral side and end flanges 1ᵇ extend downwardly. The base 1 is provided with a plurality of legs 3 which support the base as shown in Figures 1 and 2 of the drawing.

Arranged within the base 1 is the timing mechanism T of the toaster, said timing mechanism being secured to the base in any suitable manner.

The timing mechanism may be of any suitable type and therefore it will not be necessary to describe same in detail, it being sufficient to state for the purpose of this disclosure that the timing mechanism is associated with an electric switch in such manner that when the timing mechanism is set and placed in operation the associated switch is arranged so as to complete an electric circuit leading to the electric heating elements of the toaster which will be hereinafter referred to. The timing mechanism continues to operate for the predetermined period for which it is set, and at the end of such period the timing mechanism operates to automatically move the switch to a position where the toasting heat is discontinued.

In order that the present disclosure may be sufficiently complete to afford a clear understanding of a toaster constructed in accordance with this invention, I have illustrated in Figure 3 of the drawing a fragmentary inverted plan view of the toaster. This view illustrates the timing mechanism T, which as has been stated may be of any suitable construction, and a switch S which is cooperatively connected to the timing mechanism by a link L. The timing mechanism T is provided with an operating arm T' by which said timing mechanism may be set in motion, said arm being extended through an elongated opening in the front of the base 1. Electric conductors E provide an electric circuit by which electric energy is conducted to the switch S from the source of said energy, this circuit including a switch S' which controls passage of energy to the switch S. Also electric conductors E' lead from the switch S to the electric heating elements of the toaster which will be hereinafter referred to, so that electric energy will be conducted to said heating elements from the circuit provided by the conductors E when the switch S is properly set.

From the foregoing brief description of the timing mechanism T and the switch S associated therewith it will be obvious that when a toasting operation is to be performed with the aid of the toaster the operating arm T' of the timing mechanism will be operated to set said timing mechanism in motion and place the switch in the proper position to transmit energy to the heating elements of the toaster. The timing mechanism then operates for the period of time for which it is set and at the end of such period the switch is automatically operated by the timing mechanism to break the circuit leading to the heating elements and the toasting operation is completed.

The upper casing or housing 2 of the improved toaster comprises side and end walls 4 and a top wall 5. The lower edges of the side and end walls 4 are spaced upwardly from the upper face of the top wall 1ª of the base 1 to provide a free space 6 which is open on all sides, this space being maintained by legs 7 which are located at the four corners of the rectangular casing or housing 2. The legs 7 may be formed integral with the side and end walls 4, or, if preferred, said legs may be in the form of separate elements which are secured by suitable means to said side and end walls. The legs 7 rest upon the top face of the top wall of the base and angularly shaped clips 8 are secured to said legs and to the base 1 in order to securely fasten the upper casing or housing and the base together.

Arranged within the upper casing or housing 2 of the toaster is a plurality of partitions 9 each of which is preferably formed of one or more sheets of asbestos or other fire-resisting material. The partitions 9 are maintained in an upright position in any suitable manner and said partitions divide the interior of the casing or housing 2 into a plurality of toasting compartments. The partitions 9 serve as supports for electric heating elements 10 which preferably are in the form of coiled electric conductors, said electric heating elements being supported in their proper positions on the partitions by means of suitable supporting devices 11. The electric heating elements are electrically connected to the conductors E' leading from the switch S, and the electric heating elements located in adjacent toasting compartments are electrically connected together by members 12 which extend through apertures formed in the partitions. Also the electric heating elements are arranged at opposite sides of each toasting compartment and in addition to providing the members 12 for electrically connecting the heating elements in adjacent toasting compartments I employ jumpers for electrically connecting the opposed heating elements in the individual compartments so that all of the heating elements of the toaster are connected in series. The electric conductors E' which lead from the switch S to the heating elements 10 pass through flexible conduits 13 supported by the base 1 so as to avoid undue flexing of the conductors.

Arranged within each toasting compartment of the casing or housing 2 at opposite sides of said compartment is a plurality of guard wires 14. These guard wires are each shaped as shown in Figure 1 to provide a plurality of perpendicular portions 14' which are spaced outwardly from the partitions to provide spaces through which the heating elements 10 pass. In other words the heating elements 10 are interposed between the partitions and the perpendicular portions of the guard wires, hence, the slices of bread which are introduced into the toasting compartments to be toasted may not come into direct contact with the heating elements. The upper ends of the guard wires 14 are attached to the toaster by having end portions thereof introduced into recesses 15 formed between the lower face of the top 5 of the toaster and curved portions 16 of an inner plate 17. Also the lower portions of said guard wires are retained in place by means of suitably shaped clips 18 through which said lower portions of the guard wires extend. The perpendicular portions of the guard wires were provided with inwardly curved portions 14ª which serve to maintain the slices of bread in substantially vertical positions as suggested by dotted lines in Figure 1.

Disposed in each of the toasting compartments within the upper casing or housing 2 of the toaster is a vertically movable basket 19 which supports slices of bread during toasting thereof. The baskets each comprise a strip of material bent in the shape illustrated in Figure 2, said basket including a bottom portion 19ª, an upturned rear portion 19ᵇ and an inverted U-shaped portion 19ᶜ which is located at the front of the basket. Each basket is provided with an operating handle 20 which is extended through an elongated, vertically extended slot 21 formed in the front wall of the casing or housing 2 of the toaster, said handle being fixed to the inverted U-shaped front portion 19ᶜ of the basket. Each of the baskets 19 is provided with an integral downturned extension 22 which preferably is a displaced portion of the bottom wall of the basket. The spaces between the rear portions 19ᵇ of the baskets and the front portions 19 thereof are sufficient to receive slices of bread, said slices of bread being passed downwardly into the toasting compartments through openings 23 formed in the top 5 of the toaster. Also the top 5 of the toaster is provided with downturned portion 24 at each of the openings 23 which serve to guide the slices of bread as they are being introduced into or removed from the toasting compartments. The baskets are movable vertically to provide for the convenient removal of toast from the toaster.

Disposed at the top of the space 6 between the base 1 of the toaster and the casing or housing 2 thereof is a crumb tray 25. This crumb tray comprises a plate which is preferably provided with a depressed portion 25' adapted to receive the crumbs and said plate is provided with a grip 26^A at its front edge which may be engaged when it is desired to remove the tray. The tray is arranged for sliding movement with respect to the lower portion of the casing or housing 2 by having its opposite end portions supported on guiding members 26 as shown in Figure 1, which extend from front to back of the casing or housing 2, said guiding members preferably constituting substantially horizontal extensions formed integral with inner plate members of the structure or housing 2 of the toaster. The opposite end portions of the crumb tray 25 rest upon the guiding members 26 as shown clearly in Figure 1 in a manner to permit of said tray being slidingly moved with respect to said guiding members and portions 26' of the structure of the casing or housing 2 are disposed immediately above the tray to prevent upward movement thereof with respect to said guiding members.

As has been stated hereinbefore each of the baskets 19 is provided with a downwardly projected extension 22 which is located adjacent to the rear portion of the basket, and in order that these extensions may not interfere with the action of sliding the crumb tray inwardly into place, I provide said crumb tray with a downwardly curved portion 25" at the rear edge thereof. Because of the presence of the curved portion 25" the extensions 22 on the baskets 19 are cammed upwardly by said curved portion when the crumb tray is moved inwardly into place whereby any likelihood that the crumb tray would strike the extensions, as would be the case if the rear portion of the tray were straight instead of curved is eliminated. Also I provide the rear edge portion of the tray 25 with notches 27 which embrace the flexible conduits 13 whereby interference of said conduits with inward movement of the tray is prevented.

In view of the foregoing it is obvious that the base 1 of my improved toaster wherein the timing mechanism is located, and the casing or housing 2 thereof wherein the toasting operations are performed are completely insulated from each other by an air space (the space 6), hence the annoyances heretofore experienced due to overheating of the timing mechanisms of toasters are entirely eliminated. Also because of the provision of a crumb tray in the manner disclosed in this application it is plain that the toaster may be maintained in a sanitary condition at all times.

While in this application I refer to the timing mechanism as being located in the base of the toaster and state that this base is insulated from the portion of the toaster wherein the toasting operations are performed by an air space, I wish it to be understood that my invention is not limited to this precise arrangement. The fundamental thought on which the invention is based is to insulate the timing mechanism of a toaster from the portion of the toaster wherein the toasting operations are performed whether said timing mechanism is in the base of the toaster or elsewhere. The invention in its broadest aspect, therefore, involves providing a toaster which is so constructed that the timing mechanism thereof is insulated from the portion of the toaster wherein the toasting operations are performed and I wish that my claims be interpreted with this in mind.

In describing the timing mechanism of the toaster disclosed herein I refer to a single timing mechanism T and a single switch S associated therewith. However, the toaster illustrated in Figure 1 is adapted to toast four slices of bread simultaneously, and in order that only two slices of bread may be toasted when desired without operating the entire toaster I provide a double toaster each section or unit of which is independently operable. This necessitates the use of a separate timing mechanism and associated switch for each section or unit and it will be understood that the timing mechanism and switch described may be either of these timing mechanisms, and that the several reference characters will indicate like parts of both mechanisms.

I claim:

1. An automatically timed electric bread toaster comprising a housing, heat producing means within said housing for supplying heat for the toasting operations, a base for supporting said housing, timing mechanism associated with said base, said base and said housing being spaced apart to provide an insulating air space therebetween, a vertically movable basket for receiving slices of bread to be toasted, and a crumb tray slidably arranged for horizontal movement beneath said housing and adapted to receive bread crumbs therefrom, said crumb tray receiving a portion of said basket in contact therewith so as to aid in the support of said basket when same is in its lowered position.

2. An automatically timed electric bread toaster comprising a housing, heat producing means within said housing for supplying heat for the toasting operations, a base for supporting said housing, timing mechanism associated with said base, said base and said housing being spaced apart to provide an insulating air space therebetween, a vertically movable basket for receiving slices of bread to be toasted, a crumb tray arranged beneath said housing and adapted to receive bread crumbs therefrom, and means for slidably supporting said crumb tray for horizontal movement with respect to said housing, said crumb tray receiving a portion of said basket in contact therewith so as to aid in the support of said basket when same is in its lowered position.

3. An automatically timed electric bread toaster comprising a housing, heat producing means within said housing for supplying heat for the toasting operations, a base for supporting said housing, timing mechanism associated with said base, said base and said housing being spaced apart to provide an insulating air space therebetween, a vertically movable basket for supporting slices of bread to be toasted, and a crumb tray slidably arranged for horizontal movement in said space and beneath said housing and adapted to receive bread crumbs therefrom, said crumb tray receiving a portion of said basket in contact therewith so as to aid in the support of said basket when same is in its lowered position.

4. An electric bread toaster comprising a housing adapted to receive slices of bread to be toasted, a vertically movable basket for supporting slices of bread to be toasted, heat producing means within said housing for supplying heat for the toasting operations, a base for supporting said housing, said base and said housing being spaced apart to provide an insulating air space therebetween, and a crumb tray movably arranged for horizontal movement beneath said housing and adapted to receive bread crumbs therefrom, said crumb tray being provided with a portion adapted on movement of the crumb tray to engage a portion of said basket in a manner to prevent said basket portion from interfering with said movement of said crumb tray and said portion of said basket being in contact with said crumb tray when the basket is in its lowered position so as to aid in the support of said basket.

5. An electric bread toaster comprising a housing adapted to receive slices of bread to be toasted, a vertically movable basket for supporting slices of bread to be toasted, heat producing means within said housing for supplying heat for the toasting operations, a base for supporting said housing, said base and said housing being spaced apart to provide an insulating air space therebetween, and a crumb tray movably arranged for horizontal movement beneath said housing and adapted to receive bread crumbs therefrom, said crumb tray being provided with a curved portion adapted on movement of the crumb tray to engage a portion of said basket portion so as to prevent same from interfering with said movement of said crumb tray and said portion of said basket being in contact with said crumb tray when the basket is in its lowered position so as to aid in the support of said basket.

JOSEPH PAVELKA.